May 19, 1942.  E. F. NORELIUS  2,283,871
BEARING
Filed Nov. 29, 1939   3 Sheets-Sheet 1
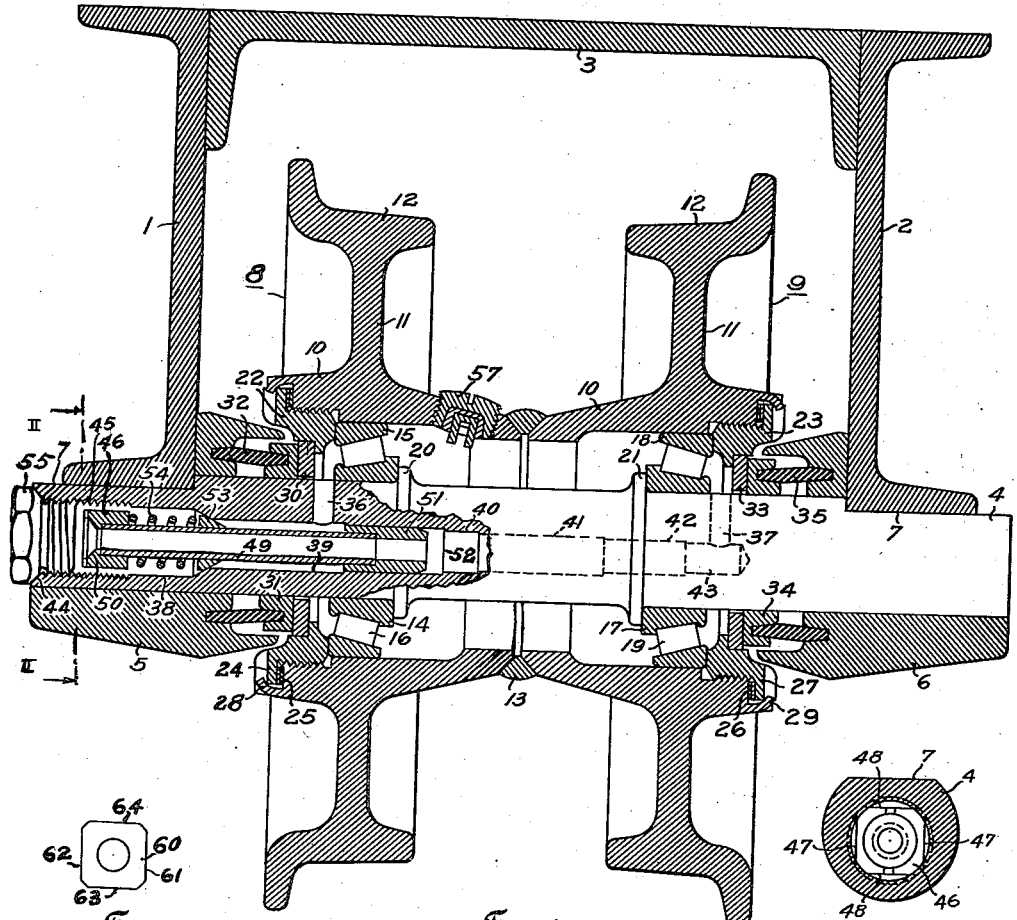
Fig. 1
Fig. 5a
Fig. 2
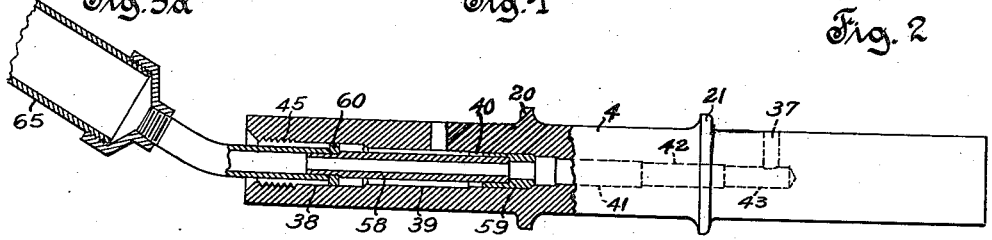
Fig. 5
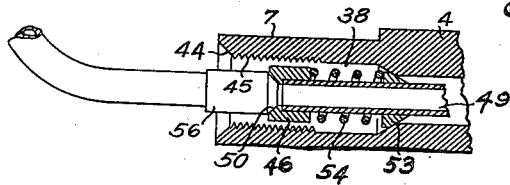
Fig. 3
Inventor
E. F. Norelius
by [Attorney signature]
Attorney May 19, 1942.     E. F. NORELIUS     2,283,871
BEARING
Filed Nov. 29, 1939     3 Sheets-Sheet 2

Inventor
E. F. Norelius
by
Attorney

May 19, 1942.   E. F. NORELIUS   2,283,871
BEARING
Filed Nov. 29, 1939   3 Sheets-Sheet 3

Inventor
E. F. Norelius
by
Attorney

Patented May 19, 1942

2,283,871

UNITED STATES PATENT OFFICE 2,283,871

BEARING

Emil F. Norelius, Springfield, Ill., assignor to Allis-Chalmers Manufacturing Company, Milwaukee, Wis., a corporation of Delaware Application November 29, 1939, Serial No. 306,622

15 Claims. (Cl. 308—109)

The invention relates to a sealed bearing for a wheel or other movable element, and it is concerned more specifically with a bearing in which a substantial quantity of lubricant may be stored for normally flooding the load bearing surfaces of the relatively stationary and movable bearing elements.

Bearings of this general character have heretofore been suggested in which a portion of one of the relatively movable bearing elements surrounds a portion of the other in spaced relation thereto to provide a storage chamber for the lubricant, and in which a gap or gaps between the relatively movable bearing elements through which lubricant would escape from the chamber are closed by a frictional seal or seals. In such bearings, as heretofore known, a feed opening which is required for admitting lubricant into the chamber is normally closed between feedings, but when it is opened in order to admit lubricant into the chamber it is apt accidentally to admit deleterious foreign matter into the chamber together with the lubricant, and an objectionable amount of such foreign matter may be accumulated within the chamber by repeated feedings. Another problem arises from the fact that the seal or seals, when once forced open due to an excessive internal pressure within the chamber during feeding, are liable to become leaky. For instance, in a seal or seals employing a resilient packing the packing material may be unduly compressed by such excessive internal pressure so that the packing material will no longer exert its proper sealing pressure after the internal pressure has subsided. Or foreign matter contained within the chamber or present about the chamber at its outside may enter and become lodged between the sealing surfaces during such forced opening. After the foreign matter has become lodged between the sealing surfaces, it not only prevents proper closure of the seal or seals, but it is also liable to mar the sealing surfaces by subsequent rotation of the bearing, all with the result that the lubricant in the enclosure must be replenished at relatively frequent intervals because the defective seal or seals permit the lubricant to leak out at an undesirably high rate of loss.

It is an object of the invention to provide an improved bearing of the mentioned character which has a flooding chamber in which the required quantity of lubricant for flooding the bearing surfaces may be retained substantially without loss for long periods of operation, and in which a substantial amount of said lubricant, when old, may conveniently be removed from the flooding chamber and be replaced by a like quantity of new lubricant, without forcing any lubricant past the sealing surfaces of the bearing. In the bearing as contemplated by the invention the liability of seal failure will thus be materially reduced, and it will be possible to operate the bearing for relatively long periods of time during which the bearing requires no attention. Moreover, the accumulation of foreign matter within the bearing by repeated feedings will be practically avoided, and it will therefore be unnecessary to disassemble the bearing from time to time in order to remove accumulated impurities. The retention of the same amount of lubricant within the bearing for relatively long periods of time, as contemplated by the invention, is further conducive to a saving of lubricating material and its costs, and in certain installations, such as in truck rollers for crawler tractors, the relatively small amount of attention required by the bearing is, moreover, conducive to a greater productive capacity of the machine on which the bearing is installed, considering the fact that the operator has to spend less time for the unproductive work of servicing the bearings.

Another object of the invention is to provide an improved system for conducting lubricant into and from the flooding chamber, the improved system being particularly adapted for use in roller assemblies, such as the truck rollers of a crawler tractor, and other installations where it is desirable to introduce lubricant into the bearing from one end, and to let old lubricant from the flooding chamber run out at the same end of the bearing.

More specifically, it is an object of the invention to provide a bearing which may be conveniently serviced from one end in the mentioned manner by establishing a counterflow of lubricant through the shaft which carries the roller, the shaft having an axial end opening for the admission and simultaneous discharge of lubricant therethrough, and a single plug being used to close the end opening after the servicing. The shaft preferably has an axially extending hollow portion adjacent to said end opening thereof, and a partition within said hollow shaft portion is preferably used to divide the interior space of the latter into two channels to form lubricant inlet and outlet passages, these passages communicating with the flooding chamber through separate apertures of the shaft remote from said end opening thereof. The apertures of the shaft through which the lubricant inlet and outlet passages communicate with the flooding chamber are preferably spaced longitudinally of the shaft, and the partition consists preferably of a tube which has a radially enlarged portion sealingly engaging a seat within the hollow shaft portion intermediate the mentioned apertures, so that fresh lubricant may be forced through the interior of the tube into the flooding chamber, and old lubricant may be simultaneously discharged through the space between the inner surface of the hollow shaft portion and the exterior surface of the tube. The tube may be permanently installed in the hollow shaft portion, in which case the tube has a suitable fitting at one end of the bearing for connection with a grease gun. Or the tube may be withdrawable from the hollow shaft portion and fixed to the grease gun, in which case a stop for limiting inward movement of the tube is preferably formed within the hollow shaft portion so that the tube may be properly positioned within the hollow shaft portion by simply pushing the tube into the hollow shaft portion as far as it will go.

The foregoing and other objects and advantages of the invention will be apparent from the following description of the drawings accompanying and forming part of this specification, and in which like reference characters designate the same or similar parts in the various views. In these drawings:

Fig. 1 is a sectional view of a truck roller for crawler tractors, and of a truck frame on which the roller is mounted;

Fig. 2 is a section of a shaft shown in Fig. 1, the section being taken on line II—II of Fig. 1;

Fig. 3 is a sectional view showing an assembly of parts for applying lubricant to the truck roller shown in Fig. 1;

Fig. 5 is a sectional view showing an assembly of parts for applying lubricant to the truck roller shown in Fig. 4;

Fig. 5a is a detail view of a washer shown in Fig. 5;

Figure 4:
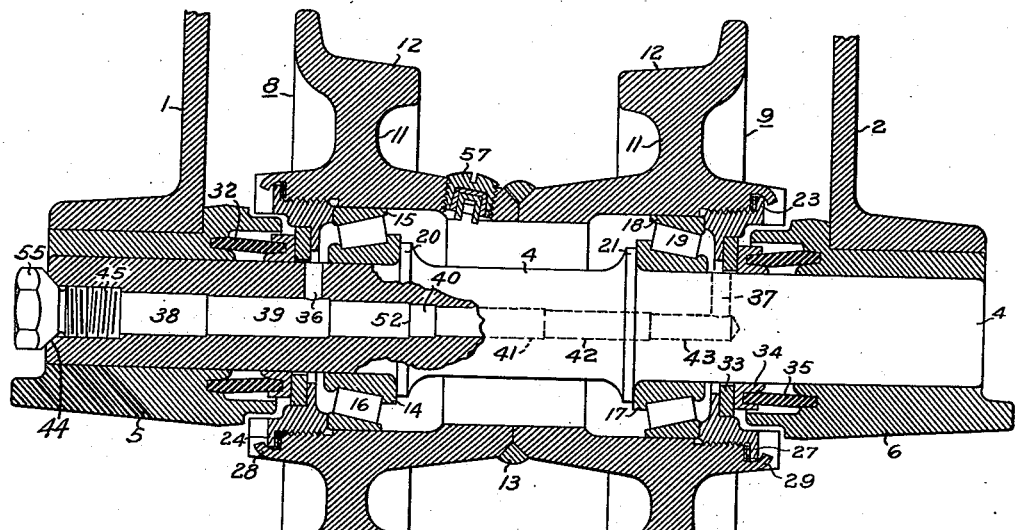
Fig. 4 shows a modification of the truck roller shown in Fig. 1, the modification residing mainly in the omission of certain parts from the interior of the shaft.

Referring to Fig. 1, vertically disposed channels 1 and 2, and a horizontally disposed channel 3 form the sides and top of a truck frame for a crawler tractor, it being assumed that the channel 1 extends longitudinally at the outer side of the truck frame while the channel 2 extends longitudinally at the inner side of the truck frame. The length of the truck frame, as usual, is such as to provide a common rigid support for a plurality of truck rollers adapted to run on a track belt not shown. One of the truck rollers, which are preferably all alike, is constructed and mounted as follows:

A shaft 4 extending transversely of the truck frame is mounted in a pair of brackets 5 and 6 which are rigidly secured to the side channels 1 and 2, respectively, in any suitable manner, the brackets preferably having lugs, not shown, for bolting to the lower flanges of the side channels. The brackets 5 and 6 are pressed in opposite directions upon the ends of the shaft 4 and are recessed to accommodate the channels 1 and 2. The lower flanges of the channels 1 and 2 engage flattened portions at the ends of the shaft 4 within the brackets 5 and 6 to prevent the shaft from turning within the brackets, one of the flattened portions of the shaft being indicated at 7 in Fig. 2.

A roller unit surrounding the shaft 4 comprises wheels 8 and 9, each of which is forged in one piece and has a hub 10, a web 11 and a flanged rim 12. The portion of the hub 10 of the wheel 8 which extends towards the wheel 9 is connected with the portion of the hub 10 of the wheel 9 which extends towards the wheel 8, by a welded seam 13 uniting contiguous edges of the hubs and extending circumferentially all the way round. A conical roller bearing within the hub 10 of the wheel 8 comprises an inner race 14, an outer race 15 and a series of conical rollers 16, the roller bearing being positioned substantially in the radial plane of the web 11 of the wheel 8. A similar roller bearing comprising an inner race 17, an outer race 18 and a series of conical rollers 19, is arranged within the hub 10 of the wheel 9, this second roller bearing being positioned substantially in the radial plane of the web 11 of the wheel 9. In order to retain the roller bearings in fixed positions axially of the shaft and of the roller unit, annular shoulders 20 and 21 are formed on the shaft 4, and bearing retainers 22 and 23 are screwed into the outer ends of the hubs 10 of the wheels 8 and 9. The inner race 14 is seated against the shoulder 20, and the inner race 17 is seated against the shoulder 21; while the bearing retainer 22 abuts against the outer race 15 and the bearing retainer 23 abuts against the outer race 18. The outer races 15 and 18 are fitted into the hubs for axial sliding movement therein, and by screwing one or the other of the bearing retainers more or less deeply into the roller the bearings may simultaneously be adjusted for proper play. For instance, by screwing the retainer 23 deeper into the hub of wheel 9, the race 18 will be pushed deeper into the hub, but the inner race 17 cannot follow such inward movement since it rests against the shoulder 21. As a result, the axial spacing of the outer races 18 and 15 will be shortened while the axial spacing of the inner races 14 and 17 remains unchanged, and axial play will be taken up at both roller bearings due to axial readjustment of the roller unit relative to the shaft. Similarly, both roller bearings may be relieved from axial compression by backing up either the retainer 22 or the retainer 23.

The bearing retainer 22 has a radial flange 24, and interposed between the flange 24 and the hub 10 of the wheel 8 are a number of shims 25 for purposes of adjustment. Similarly, a number of shims 26 are interposed between a rarial flange 27 of the retainer 23 and the hub 10 of the wheel 9. The number of shims at each end of the roller unit is so selected that the shims are tightly compressed when the wheel unit is adjusted for proper functioning of the roller bearings, and the flanges 24 and 27 have teeth which permit some of the metal of the hubs to be peened over, as shown at 28 and 29, to lock the retainers in adjusted position. As shown in Fig. 1, the roller bearing within the hub of wheel 8 tapers toward the outer end of shaft 4, while the roller bearing within the hub of wheel 9 tapers toward the inner end of shaft 4. These bearings, therefore, while rotatably supporting the wheel unit 8, 9 on the shaft 4, also function to retain the wheel unit in axially fixed position on the shaft 4.

The inner surfaces of the hubs 10 are spaced radially from the outer surface of the shaft 4, and the space between the shaft and the hubs is closed by end seals at the axially outer sides of the roller bearings. The end seal at the axially outer side of the roller bearing within wheel 8 comprises a seal plate 30 which is fitted into a recess of the bearing retainer 22 and rests with its rear face on an inwardly projecting flange of the bearing retainer. The seal plate 30 has a central bore of slightly larger diameter than the portion of the shaft 4 which extends through the seal plate, so that the seal plate may rotate freely together with the wheel unit 8, 9 relative to the shaft 4. A seal ring 31 surrounds the shaft 4 at the side of the seal ring 30 facing the bracket 5, and a seal boot ring 32 of rubber-like material is interposed between the bracket 5 and the seal ring 31. The seal boot ring 32 is wedged at one end into a circular groove of the bracket 5, and at the other end into a circular groove of the seal ring 31, so that the seal boot ring will be restrained from rotation relative to the bracket 5, and the seal ring 31 will be restrained from rotation relative to the seal boot ring 32. The axial length of the seal boot ring is such that it will be shortened by axial compression during assembly of the wheel unit 8, 9 and bracket 5 with the shaft 4, and the seal boot ring 32 therefore exerts an axial thrust upon the seal ring 31 which in turn is axially slidable on the shaft 4 and abuts against the seal plate 30 as shown in Fig. 1. In other words, the seal ring 31 is resiliently urged into sealing contact with the seal plate 30 by the seal boot ring 32. The seal plate 30 and the seal ring 31 are preferably made of steel, and in order to obtain a satisfactory seal, the radial sealing surface of the plate 30 facing the ring 31, as well as the radial sealing surface of the ring 31 facing the plate 30 have a very smooth finish in the nature of a polish, and these surfaces must be straight within very close limits. With the proper degree of accuracy this type of seal may be made practically leak-proof.

The end seal at the axially outer side of the roller bearing within the wheel 9 is an exact duplicate of the seal at the other end of the roller unit which has just been described. That is, a seal plate 33 corresponding to the seal plate 30 is fitted into the bearing retainer 23, and a seal ring 34 corresponding to the seal ring 31 is resiliently urged into sealing contact with the seal plate 33 by a seal boot ring 35 corresponding to the seal boot ring 32, the seal boot ring 35 being axially compressed between the seal ring 35 and the bracket 6.

Referring now to the filling and flushing of the bearing compartment of the truck roller shown in Fig. 1 with lubricant, the following should be noted. The shaft 4 has an axial bore which is somewhat offset from the axial center of the shaft, as shown in Figs. 1 and 2, and which communicates with the space between the hubs 10 and the exterior of the shaft through radial bores 36 and 37. Beginning at the outer end of the shaft, the axial bore is made in six steps by first drilling the section 38 of largest diameter and then successively drilling the continuing sections 39, 40, 41, 42 and 43 which are of progressively smaller diameters. The first section 38 is beveled at the outer end of the shaft to provide a conical seat 44, and screw threads 45 continue from the seat 44 axially into the shaft to a substantial depth. Screwed into the threaded portion of the bore section 38 is a block 46 which has flat parallel sides 47 and flat parallel sides 48 at right angles to the sides 47, as shown in Fig. 2. The four corners of the block 46 are threaded for engagement with the threads 45 so that the block is held securely in place while four segmental passages are left open between the four flat sides of the block and the circular inner surface of the bore section 38. A cylindrical tube 49 is secured at one end centrally within the block 46, the latter having a conical recess 50 in communication with the interior of the tube 49. Secured to the other end of the tube 49 is a cylindrical head 51 which is fitted into a reamed portion of the third section 40 of the axial bore of the shaft. The reaming of the section 40 leaves a shoulder within said section as indicated at 52. The head 51 has an axial bore in alinement with the interior of the tube 49, and the outer diameter of the head is somewhat larger than that of the tube so that the head forms a radial enlargement of the tube. In order to provide for a substantially fluid-tight connection between the head 51 and the axial bore of the shaft the head has a cylindrical outer surface of considerable axial length which closely conforms with the reamed inner surface of the bore, the diameter of the cylindrical surface of the head being preferably only a few thousandths of an inch smaller than the diameter of the reamed portion of the bore. Slidably mounted on the tube 49 is a conical valve body 53, and a conical seat for the valve body is formed at the inner end of the bore section 38. A coil spring 54 compressed between the valve body 53 and the block 46 urges the valve body upon its seat so that the space between the exterior of the tube 49 and the circumferential surface of the second bore section 39 will be closed at the end of said bore section adjacent to the bore section 38. A plug 55 for closing the axial bore of the shaft at the outer end thereof is screwed into the threaded portion of the bore section 38 independently of the block 46, the plug having a tapered portion adapted to sealingly engage the tapered seat 44.

In order to lubricate the truck roller shown in in Fig. 1 the plug 55 is removed from the outer end of the shaft 4, and the nozzle 56 of a grease gun is pressed upon the conical seat 50 of the block 46, as shown in Fig. 3. The grease gun is then operated to eject lubricant and lubricant is thereby caused to pass through the interior of the tube 49 and the bore of head 51 into the sections 40, 41, 42 and 43 of the bore of the shaft. Continued delivery of lubricant from the grease gun forces the lubricant through the radial bore 37 into the space between the shaft 4 and the hubs 10 of the wheels 8 and 9, which space is closed at its opposite ends by the rotary seals comprising the seal plates 30, 33 and seal rings 31, 34, and forms a flooding chamber for the roller bearings 14, 15, 16 and 17, 18, 19. The radial bore 37 communicates with said flooding chamber at the axially outer side of the inner bearing race 17 and at the inner side of the seal plate 33, and the lubricant issuing from the radial bore 37 passes through the spaces between the rollers 19 into the large portion of the flooding chamber between the two roller bearings. The rollers 19 and the bearing surfaces of the inner and outer races 17 and 18 will therefore be flushed by the lubricant issuing from the radial bore 37. After a sufficient quantity of lubricant has been crowded into the space between the roller bearings, continued delivery of lubricant from the grease gun causes the lubricant to pass through the spaces between the rollers 16 to the axially outer side of the roller bearing of the wheel 8. The rollers 16 and the bearing surfaces of the inner and outer races 14 and 15 will therefore likewise be flushed by lubricant. The radial bore 36 of the shaft 4 communicates with the space between the shaft and the hubs of the wheels 8 and 9 at the axially outer side of the bearing race 14 and at the inner side of the seal plate 30. The lubricant passes through the spaces between the rollers 16 therefore finds an outlet through the radial bore 36, and through this radial bore it is crowded into the space within the bore section 39 surrounding the tube 49 between the head 51 and the valve body 53. Since the head 51 is closely fitted into the bore of the shaft, as has been explained hereinbefore, the lubricant cannot escape from the bore section 39 around this head, and escape at the outer end of the bore section 39 is obstructed by the valve body 53 which is normally urged upon its seat by the spring 54. A certain hydrostatic pressure upon the lubricant within the bore section 39 is therefore necessary to discharge the lubricant from the bore section 39 past the valve body 53, and such hydrostatic pressure is readily created by continued delivery of lubricant from the grease gun. It should be noted, however, that such hydrostatic pressure also acts upon the seal rings 31 and 34 since the seal plates 30 and 33 are not tightly fitted upon the shaft 4 as has been explained hereinbefore. The seal rings 31 and 34 are urged with substantial pressure against the seal plates 30 and 33 by the seal boot rings 32 and 35, and the seal rings 31 and 34 do not yield to the hydrostatic pressure to which the lubricant is subjected in order to force the valve body 53 from its seat and permit discharge of lubricant from the bore section 39. In other words, the spring 54 is made relatively weak so that it will not permit the creation of a hydrostatic pressure within the bearing compartment, which would be sufficient to force the seal rings 31 and 34 out of sealing contact with the seal plates 30 and 33.

The lubricant expelled from the bore section 39 past the valve body 53 passes through the bore section 38 exteriorly of the tube 49, block 46 and nozzle 56, the segmental spaces between the flat sides 47 and 48 of the block 46 and the circular surface of the bore section 38 permitting passage of the lubricant around the block 46. An oil pan or similar receptacle may be placed under the bracket 5 to collect the lubricant emerging from the outer end of the shaft 4. After completion of the above described lubricating and flushing operation the nozzle 56 of the grease gun is withdrawn from the shaft 4 and the plug 55 is quickly replaced before any substantial amount of the lubricant accumulated within the flooding chamber has had a chance to run out through the tube 49. The lubricant entrapped in the flooding chamber will be retained therein for very long periods of operation, and it will be noted that the roller bearings 14, 15, 16 and 17, 18, 19 are permanently flooded by the hydrostatic distribution of the lubricant stored within the flooding chamber. A magnetic plug 57 is mounted in the hub of wheel 8 to intercept particles of ferrous material which may get loose within the bearing compartment or be flushed into it with the lubricant, and which, if permitted to float around may work between the cooperating surfaces of the end seals and impair their efficiency. The shims 25 and 26, as stated, are tightly compressed to prevent the loss of lubricant past the threads of the bearing retainers 22 and 23.

It will be seen that by constructing and servicing the truck roller shown in Fig. 1 in the manner explained hereinbefore a substantial quantity of lubricant will be stored within the flooding chamber or enclosure for the two antifriction bearings without creating an internal pressure within said chamber of such magnitude as to open one or both of the rotary seals. These seals are practically leak-proof and no, or practically no, lubricant will be lost from the chamber during an extended period of time during which the roller is subject to rotation and during which period the axial end opening of the shaft is tightly sealed by the plug 55. When at the end of such period lubricant is injected in the described manner into the chamber through the radial bore 37, discharge of lubricant from the chamber through the radial bore 36 will start as soon, or almost as soon as the new lubricant enters the chamber through the bore 37. By continued delivery of new lubricant into the chamber through the radial bore 37, a substantial portion of the old lubricant will be expelled from the chamber and replaced by a like quantity of new lubricant. Non-metallic impurities which may accidentally be carried into the chamber together with the new lubricant will not be accumulated within the chamber by repeated servicings of the bearings, since the periodic renewal of the lubricant will practically exclude such accumulation, and it will therefore never be necessary to disassemble the roller unit for the purpose of removing accumulated impurities from the chamber.

In the embodiment of the invention shown in Figs. 1 and 3 the flooding chamber communicates, at a point in proximity to one of the closed ends thereof; namely, at the outer orifice of the radial bore 37, with an inlet through the shaft 4 for periodic connection to a lubricant feeding device and the flooding chamber communicates, at a point in proximity to the other of the closed ends thereof; namely, at the outer orifice of the radial bore 36, with an outlet for the discharge of lubricant from the flooding chamber simultaneously with the delivery of lubricant from said feeding device into the flooding chamber. The mentioned inlet through the shaft is periodically connectible at the conical seat 50 of the block 46 with the nozzle 56 of a grease gun, as shown in Fig. 3, and the mentioned outlet, which comprises the radial bore 36 and the space surrounding the tube 49 within the bore sections 38 and 39, conducts lubricant from the flooding chamber to the axial end opening of the shaft where it is discharged from the shaft, as mentioned hereinbefore. The plug 55 constitutes a releasable closure means for preventing passage of lubricant from the flooding chamber through the inlet and outlet during the intervals between feedings.

Another way of carrying out the invention is illustrated by Figs. 4 and 5. The construction of the truck roller shown in Fig. 4 is identical with that shown in Fig. 1 insofar as the wheels 8, 9, the roller bearings and the seals are concerned, and the description of these parts which has been made hereinbefore in connection with Fig. 1 also applies to Fig. 4. The principal difference between the truck roller shown in Fig. 4 from that shown in Fig. 1 resides in the omission of the tube 49 and its associated parts from the axial bore of the shaft 4. As shown in Fig. 4, the shaft 4 has a stepped axial bore comprising bore sections 38, 39, 40, 41, 42 and 43 which are drilled in the manner described hereinbefore in connection with Fig. 1. The portion of the bore section 40 extending from the inner end of the bore section 39 to the shoulder 52 is reamed to an accurate diameter, the shoulder 52 being formed by this reaming operation. The outer end of the bore section 38 is beveled to form the conical seat 44 for the plug 55, the plug being screwed into the threaded portion 45 of the bore section 38. The brackets 5 and 6 for the shaft 4 as shown in Fig. 4 are somewhat different from the brackets 5 and 6 shown in Fig. 1 in that the seating surfaces for the channels 1 and 2 are formed on the brackets of Fig. 4 above the shaft 4, and the shaft 4 has no flat portions for engagement with the channels. In the construction shown in Fig. 4 the shaft is prevented from rotation within the brackets 5 and 6 by a press fit of the shaft within the brackets, and the axis of the axial bore of the shaft 4 in Fig. 4 coincides with the axis of said shaft.

The truck roller shown in Fig. 4 is lubricated and flushed by means of a grease gun which has a special nozzle as shown in Fig. 5. The nozzle comprises a relatively long tube 58 which has a head 59 permanently secured to its forward end. The head 59 forms a radial enlargement of the tube 58 and has an outer cylindrical surface of substantial length, the diameter of this cylindrical surface being only a few thousandths of an inch smaller than the diameter of the reamed portion of the bore section 40. In order to lubricate the truck roller shown in Fig. 4 the plug 55 is removed from the shaft 4, and the nozzle is shoved into the axial bore of the shaft as shown in Fig. 5. During this operation the head 59 slides into the reamed portion of the bore section 40, and inward movement of the nozzle is continued until the forward end of the head 59 engages the shoulder 52. The head 59 has then fully entered the reamed portion of the bore section 40, and the tube 58 is circumferentially spaced from the surrounding surfaces of the bore sections 38 and 39. A washer 60 is permanently secured to the tube 58 rearwardly of the head 59 at such a distance therefrom that when the nozzle is fully inserted into the shaft 4 the washer 60 occupies the position within the bore section 38 in which it is shown in Fig. 5. As shown in Fig. 5a the washer 60 has flat parallel sides 61 and 62, and flat parallel sides 63 and 64 at right angles to the sides 61 and 62, and the corners of the washer are rounded for sliding engagement with the circumferential surface of the bore section 38. When seated in the bore section 38 the washer acts as a support for the tube 58, and the flat sides of the washer leave four segmental passages within the bore section 38 similar to the four segmental passages described hereinbefore in connection with the block 46 of Fig. 2. Lubricant delivered from the barrel 65 of the grease gun shown in Fig. 5 passes through the interior of tube 58 and through the head 59 into the bore sections 41, 42 and 43 and through the radial bore 37 into the flooding chamber of the truck roller shown in Fig. 4. The lubricant issuing from the radial bore 37 flushes both roller bearings in the manner described hereinbefore in connection with Fig. 1, and finds an outlet through the radial bore 36. It will be noted that in Fig. 5 the space within the bore section 39, exteriorly of the tube 58, is closed at the inner end of said bore section by the head 59, the close fit between said head and the reamed portion of the bore section 40 being such as to practically prevent the passage of lubricant around said head. As distinguished from the construction shown in Fig. 1, however, the construction shown in Fig. 5 does not provide for a check valve including a valve body such as the valve body 53 in Fig. 1, for obstructing the discharge of lubricant at the outer end of the bore section 39 along the exterior surface of the tube 58. In Fig. 5 the lubricant leaving the bearing compartment through the radial bore 36 moves toward the outer end of the shaft 4 through the space exteriorly of the tube 58 and past the washer 60 through the mentioned segmental passages at the sides of said washer. The space between the exterior of the tube 58 and the surrounding surface of the bore section 39 is comparatively long and narrow so that the lubricant flowing through this space is retarded by a certain amount of frictional resistance, and the lubricant likewise encounters a certain amount of frictional resistance in passing through the mentioned segmental passages around the washer 60. The construction shown in Fig. 5 therefore also causes a certain hydrostatic pressure to be created in the bearing compartment while lubricant is being delivered into the bearing compartment from the grease gun. It will be seen however that the truck roller shown in Fig. 4 may be readily lubricated and flushed by means of the equipment shown in Fig. 5 without creating a hydrostatic pressure within the bearing compartment which would be so high as to force the seal rings 31 and 34 out of sealing contact with the seal plates 30 and 33.

After the truck roller shown in Fig. 4 has been lubricated and flushed in the described manner, the tube 58 together with the head 59 and washer 60 are withdrawn from the shaft 4 and the plug 55 is quickly replaced before any substantial quantity of lubricant accumulated within the flooding chamber has had a chance to flow out at the outer end of the shaft. It will be seen that by inserting the long nozzle into the shaft 4 as shown in Fig. 5, the axial bore of the shaft is partitioned into two channels, one interiorly of the tube 58, which communicates with the flooding chamber through the radial bore 37, and another exteriorly of the tube 58, which communicates with the flooding chamber through the radial bore 36. The shoulder 52 within the bore section 40 is a convenience for the operator since he only has to shove the nozzle into the shaft as far as it will go in order to be sure that the nozzle is properly sealed to an intermediate portion of the axial bore between the radial bores 36 and 37. If the head 59 fits snugly into the reamed portion of the bore section 40, as has been described hereinbefore, it will not be necessary to press the head 59 very tightly against the shoulder 52 in order to seal the nozzle to the shaft, but if desired the construction could be modified so as to effect the seal between the nozzle and the shaft solely by axial pressure of the nozzle head against a shoulder within the axial bore of the shaft.

In the embodiment of the invention shown in Figs. 4 and 5, as in the embodiment of the invention shown in Figs. 1 and 3, the flooding chamber communicates, at a point in proximity to one of the closed ends thereof, with an inlet through the shaft 4 for periodic connection with a lubricant feeding device, and the flooding chamber further communicates, at a point in proximity to the other of its closed ends, with an outlet for the discharge of lubricant from the flooding chamber simultaneously with the delivery of lubricant from said feeding device into the flooding chamber. The insertion of the nozzle 58, 59 as shown in Fig. 5, as well as the insertion of the nozzle head 56 as shown in Fig. 3, into the hollow portion of the shaft 4 through the axial end opening of the latter establishes an inlet passage from a lubricant feeding device through the axial end opening of the shaft to the flooding chamber, and an outlet passage from the flooding chamber through said axial end opening of the shaft. As distinguished from the construction shown in Figs. 1 and 3, where the tubular member including the tube 49 has an end portion within the hollow portion of the shaft adjacent to the axial end opening of the latter for coupling with the lubricant feeding nozzle, the construction shown in Figs. 4 and 5 provides for coupling of the tubular member, represented by the nozzle, with an internal seat intermediate the two apertures afforded by the radial bores 36 and 37, the internal seat being formed by the reamed portion of the bore section 40 and engaged by the nozzle head 59 in order to separate the outlet passage from the inlet passage, as has been explained hereinbefore. The plug 55 constitutes a closure element which is insertable into the axial end opening of the shaft in lieu of the partitioning element represented by the nozzle head 56 shown in Fig. 3, and by the nozzle 58, 59 shown in Fig. 5.

Figure 6:
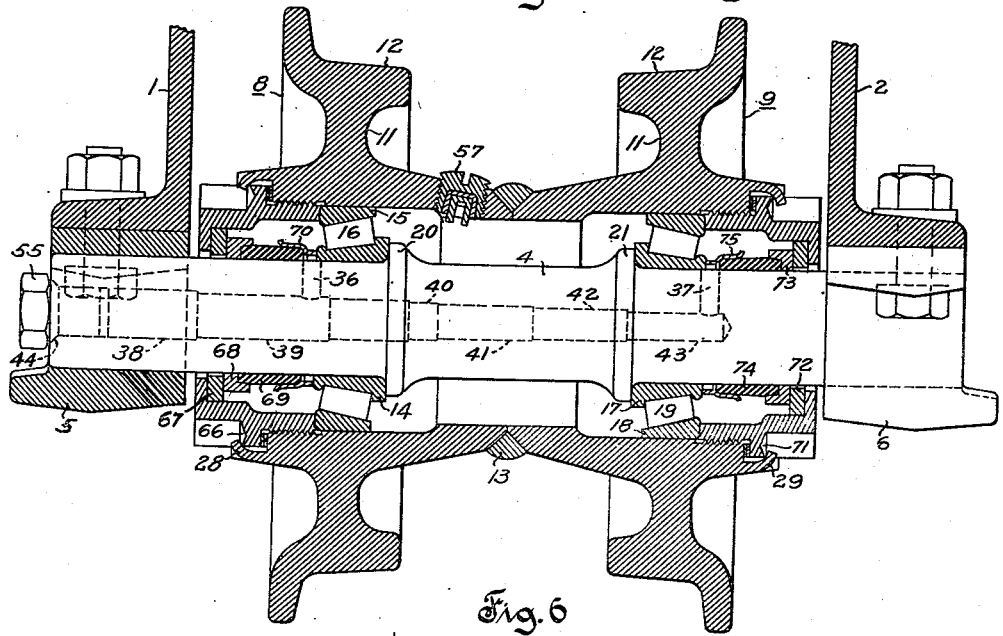
Fig. 6 shows a second modification of the truck roller shown in Fig. 1, the modification residing mainly in the omission of certain parts from the interior of the shaft, and in a different arrangement of the seals.
Figure 8:
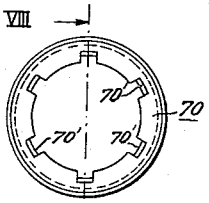
Figs. 7 and 8 are detail views of a retainer shown in Fig. 6, Fig. 8 being a section on line VIII—VIII of Fig. 7.
Figure 7:
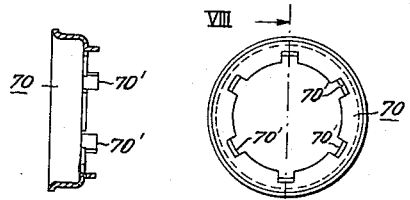

The truck roller shown in Fig. 6 is a modification of the one shown in Fig. 4, the principal difference between the two constructions residing in the arrangement of the rotary end seals for the bearing compartment. As shown in Fig. 6, a bearing retainer 66 screwed into the hub 10 of the wheel 8 has an inwardly projecting flange adjacent to the shaft bracket 5, and a seal plate 67 is fitted into the bearing retainer 66 and rests against the inner face of the flange. The seal plate 67 has a central bore accommodating the shaft 4 without binding so that the seal plate may rotate together with the wheel 8 about the shaft. A seal ring 68 of L-shaped cross-section has a radial sealing surface in contact with a radial sealing surface at the inner side of the seal plate 67, the seal plate and seal ring being made of steel and the relatively contacting sealing surfaces being smoothly finished as explained hereinbefore in connection with the seal plate 30 and seal ring 31 of Fig. 1. A seal boot ring 69 of rubber-like material is enclosed at its outer end within the annular space between the shaft 4 and the axially extending flange of the seal ring 68, and the inner end of the seal boot ring 69 is enclosed between the shaft 4 and the axially extending flange of a sheet metal ring 70. A series of tongues 70' are formed on the ring 70 in the manner illustrated in Figs. 7 and 8, by slotting the radial web of the ring and bending portions thereof out of the plane of the web. The tongues 70' abut axially against the inner race 14 of the roller bearing within the wheel 8, and the seal boot ring 69 is axially compressed between the seal ring 68 and the ring 70 so as to yieldingly urge the seal ring 68 into sealing contact with the seal plate 67. It will be noted that the seal boot ring 69 leaves the radial bore 36 of the shaft 4 uncovered, and that lubricant may pass from the flooding chamber into the radial bore 36 through the spaces between the tongues 70' of the ring 70, the function of the ring 70 being that of a perforated spacer between the seal boot ring 69 and the inner bearing race 14.

The end seal at the wheel 9 of Fig. 6 is constructed in the same manner as has just been described with reference to the end seal at the wheel 8. That is, the end seal at wheel 9 comprises a bearing retainer 71 corresponding to the bearing retainer 66; a seal plate 72 corresponding to the seal plate 67; a seal ring 73 corresponding to the seal ring 68; a seal boot ring 74 corresponding to the seal boot ring 69; and a sheet metal ring 75 corresponding to the sheet metal ring 70, the sheet metal ring 75 acting as a perforated spacer to permit passage of lubricant from the radial bore 37 of the shaft 4 into the flooding chamber.

The truck roller shown in Fig. 6 is lubricated and flushed in the same manner as has been explained hereinbefore in connection with Fig. 4.

Figure 9:
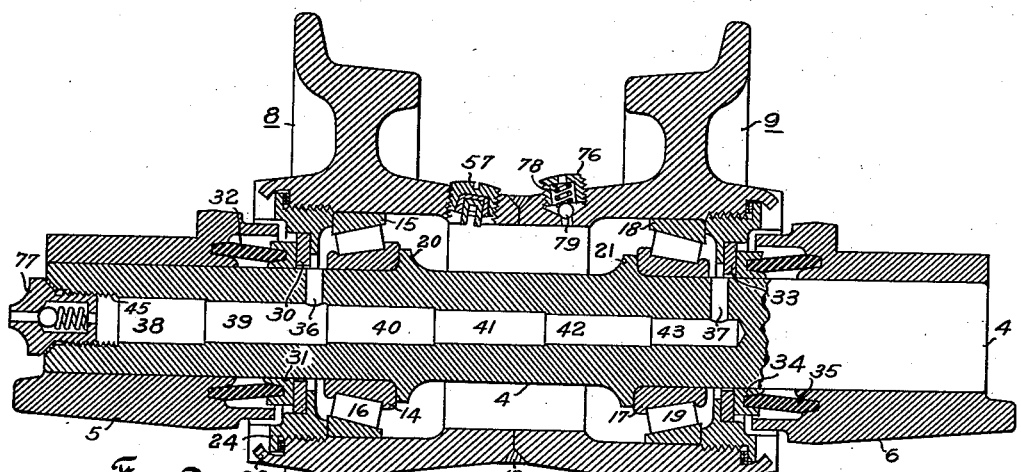
Figs. 9, 10 and 11 show a third, fourth and fifth modification, respectively, of the truck roller shown in Fig. 1.

Fig. 9 shows a fourth way of carrying out the invention. This figure shows the same arrangement of the seals as that shown in Figs. 1 and 2, and a stepped bore within the shaft 4 the same as shown in Fig. 4, except that the bore section 40 is not reamed. A ball check valve 76 is mounted in an opening of the hub 10 of the wheel 9, and a self-closing grease fitting 77 is screwed into the threaded portion 45 of the bore section 38. In order to lubricate and flush the truck roller shown in Fig. 9 a grease gun is applied to the fitting 77, and lubricant is forced into the axial bore of the shaft. From the bore the lubricant passes simultaneously through the radial bores 36 and 37 into the flooding chamber, and after working its way through the roller bearings it will leave the flooding chamber through the check valve 76. The pressure of the spring 78 which presses the ball 79 of the check valve upon its seat is made sufficiently weak so that the flooding chamber may be flushed with lubricant without creating a hydrostatic pressure therein which would force the seal ring 31 out of sealing engagement with the seal plate 30, or the seal ring 34 out of sealing engagement with the seal plate 33.

Figure 10:
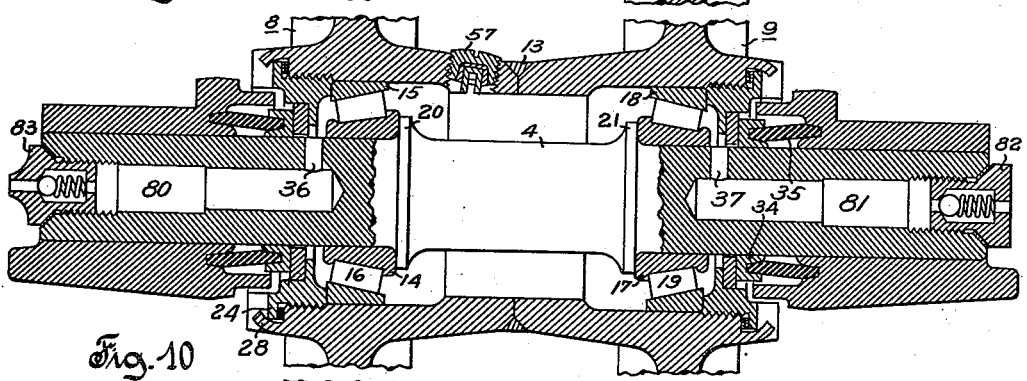

A fifth way of carrying out the invention is shown in Fig. 10. This figure shows the same arrangement of the seals as Figures 1 and 2, but the shaft 4 is bored differently. In the construction shown in Fig. 10 an axial bore 80 extends into the shaft 4 from the outer end thereof far enough to communicate with the radial bore 36, and another axial bore 81 extends into the shaft from the inner end thereof and far enough to communicate with the radial bore 37. A check valve 82 is screwed into the bore 81 at the inner end of the shaft, and a self-closing grease fitting 83 is screwed into the bore 80 at the outer end of the shaft. In order to lubricate and flush the truck roller shown in Fig. 10 a grease gun is applied to the fitting 83, and lubricant is forced through the axial bore 80 and radial bore 36 into the flooding chamber. Lubricant issuing from the bore 36 passes through the roller bearing of the wheel 8, then through the roller bearing of the wheel 9, and it is discharged from the flooding chamber through the radial bore 37, axial bore 81 and check valve 82. Like the check valve 76 of Fig. 9, the check valve 82 of Fig. 10 functions to relieve the flooding chamber from hydrostatic pressure which would force the end seals open during filling of the flooding chamber with lubricant or during flushing.

In the embodiments of the invention shown in Figs. 9 and 10, as in the embodiments shown in Figs. 1 and 3 and in Figs. 4 and 5, the flooding chamber communicates with an inlet through the shaft 4 for periodic connection to a lubricant feeding device, and the flooding chamber also communicates with an outlet for the discharge of lubricant from the flooding chamber simultaneously with the delivery of lubricant from said feeding device into the flooding chamber. The ball check valve 76 and the fitting 77 in Fig. 9, and the check valve 82 and fitting 83 in Fig. 10 constitute releasable closure means for preventing passage of lubricant from the flooding chamber through the inlet and outlet during the intervals between feedings.

Figure 11:
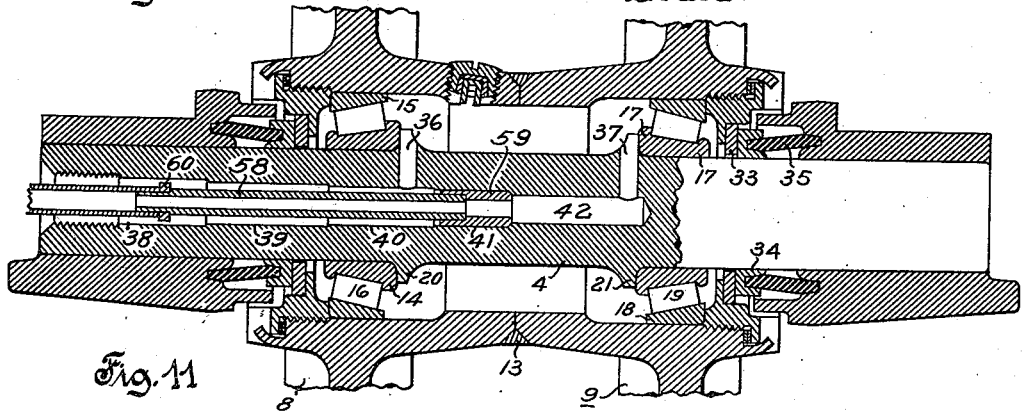

A sixth way of carrying out the invention is shown in Fig. 11. The construction shown in this figure follows the general principles explained hereinbefore in connection with Figs. 4 and 5, but it is modified in such a manner that lubricant may be introduced into the flooding chamber and a substantial quantity of old lubricant therein may be expelled without conducting the lubricant through the spaces between the rollers of the roller bearings. As shown in Fig. 11 the radial bore 36 of the shaft 4 is arranged in close proximity to the axially inner side of the bearing race 14 and the radial bore 37 is arranged in close proximity to the axially inner side of the bearing race 17. The head 59 of the grease gun nozzle is circumferentially sealed to an intermediate portion of the axial bore of the shaft 4 between the radial bores 36 and 37 in the manner explained hereinbefore in connection with Fig. 5. Lubricant ejected from the grease gun enters the flooding chamber through the radial bore 37, and discharge of lubricant from the flooding chamber may take place through the radial bore 36 and through the annular space between the exterior of the nozzle tube 58 and the surrounding surfaces of the bore sections 40, 39 and 38. The radial bores 36 and 37 are spaced axially of the shaft 4 a substantial distance so that a substantial quantity of old lubricant within the bearing compartment may be expelled therefrom by feeding new lubricant through the radial bore 37. The truck roller shown in Fig. 11, like those shown in Figs. 1, 4, 6, 9 and 10, may be lubricated and flushed without necessitating or causing opening of the end seals of the flooding chamber.

It should be understood that it is not intended to limit the invention to the details of construction herein shown and described, since various modifications within the scope of the claims may occur to persons skilled in the art.

It is claimed and desired to secure by Letters Patent:

1. In a bearing, a stationary bearing element, a movable bearing element supported on said stationary bearing element, a portion of one of said bearing elements surrounding a portion of the other in spaced relation thereto, one of said portions having an opening forming an internal passage therein and two apertures connecting said passage with the space between said portions of said bearing elements, means including a sealing device between said portions of said bearing elements for retaining lubricant within said space, means including a partitioning element insertable into and withdrawable from said internal passage and adapted to cooperate with said bearing element having said passage, to divide said passage into a first channel in communication with one of said apertures through which lubricant may be delivered into said space, and into a second channel separate from said first channel and in communication with the other of said apertures through which lubricant may be discharged from said space, and a closure element for said passage insertable into said opening in lieu of said partitioning element.

2. In a truck roller for track laying tractors, a stationary shaft, stationary brackets at opposite ends of said shaft, a pair of anti-friction bearings having inner races mounted on said shaft between said brackets, a roller unit having a hub surrounding said shaft and rotatably secured thereto in axially fixed position by said anti-friction bearings, end seals for the space between said hub and shaft containing said anti-friction bearings, said end seals comprising seal plates on said roller unit encircling portions of said shaft between said brackets and anti-friction bearings, axially slidable seal rings on said shaft between said inner races and said seal plates, perforated spacers surrounding said shaft, and bearing laterally against said inner races at the sides thereof facing said seal rings, and sleeves of resilient material surrounding said shaft and reacting between said seal rings and said spacers to urge said seal rings laterally against said seal plates, said shaft having an axial bore communicating with said space through the perforations of said spacers and through radial bores in said shaft at the axially outer sides of said inner races, and means for coupling said axial bore intermediate said radial bores with a tubular member extending into said axial bore through an opening thereof at one end of said shaft.

3. In a roller assembly, a stationary shaft having an axially extending hollow portion and an axial end opening therefor, a roller having a wall extending axially of said shaft and surrounding said hollow portion thereof in radially spaced relation to the outer surface of said shaft, bearing means within said roller supportingly connecting said shaft and roller for relative rotation about the axis of said shaft, closure means for the space between said shaft and roller at opposite sides, respectively, of said bearing means to provide a flooding chamber for said bearing means within said roller, said shaft having a first aperture remote from said axial end opening thereof, connecting the interior space of said hollow shaft portion with said flooding chamber, and a second aperture spaced from said end opening and first aperture axially of said shaft and connecting said interior space of said hollow shaft portion with said flooding chamber, means including a tubular member within said hollow shaft portion for partitioning said interior space thereof into two channels communicating, respectively, with said apertures, and a plug for closing said axial end opening of said shaft, said tubular member having an end portion within said hollow shaft portion adjacent to said axial end opening thereof for coupling with a lubricant feeding nozzle insertable into said hollow shaft portion through said axial end opening thereof after removal of said plug.

4. In a roller assembly, a stationary shaft having an axially extending hollow portion and an axial end opening therefor, a roller having a wall extending axially of said shaft and surrounding said hollow portion thereof in radially spaced relation to the outer surface of said shaft, bearing means within said roller supportingly connecting said shaft and roller for relative rotation about the axis of said shaft, closure means for the space between said shaft and roller at opposite sides, respectively, of said bearing means to provide a flooding chamber for said bearing means within said roller, said shaft having a first aperture remote from said axial end opening thereof, connecting the interior space of said hollow shaft portion with said flooding chamber, and a second aperture spaced from said end opening and first aperture axially of said shaft and connecting said interior space of said hollow shaft portion with said flooding chamber, means including a tubular member within said hollow shaft portion for partitioning said interior space thereof into a first channel communicating with the interior space of said tubular member and with one of said apertures to form a lubricant inlet passage for said flooding chamber, and a second channel communicating with the space surrounding said tubular member within said hollow shaft portion and with the other of said apertures to form a lubricant outlet passage for said flooding chamber, and means cooperating with said tubular member and with said shaft to check the discharge of lubricant from said flooding chamber through said lubricant outlet passage.

5. In a roller assembly, a stationary shaft having an axially extending hollow portion and an axial end opening therefor, a roller having a wall extending axially of said shaft and surrounding said hollow portion thereof in radially spaced relation to the outer surface of said shaft, bearing means within said roller supportingly connecting said shaft and roller for relative rotation about the axis of said shaft, closure means for the space between said shaft and roller at opposite sides, respectively, of said bearing means to provide a flooding chamber for said bearing means within said roller, said shaft having a first aperture remote from said axial end opening thereof, connecting the interior space of said hollow shaft portion with said flooding chamber, and a second aperture intermediate said end opening and said first aperture, connecting said interior space and flooding chamber, means including a tubular member within said hollow shaft portion for partitioning said interior space thereof into a first channel communicating with the interior space of said tubular member and with said first aperture to form a lubricant inlet passage for said flooding chamber, and a second channel exteriorly of said tubular member within said hollow shaft portion, communicating with said second aperture to form a lubricant outlet passage for said flooding chamber, and check valve means including a valve body slidable on said tubular member and cooperating with said shaft to check the discharge of lubricant from said flooding chamber through said lubricant outlet passage.

6. In a roller assembly, a stationary shaft having an axially extending hollow portion and an axial end opening therefor, a roller having a wall extending axially of said shaft and surrounding said hollow portion thereof in radially spaced relation to the outer surface of said shaft, bearing means within said roller supportingly connecting said shaft and roller for relative rotation about the axis of said shaft, closure means for the space between said shaft and roller at opposite sides, respectively, of said bearing means to provide a flooding chamber for said bearing means within said roller, said shaft having a first aperture remote from said axial end opening thereof, connecting the interior space of said hollow shaft portion with said flooding chamber, and a second aperture intermediate said end opening and said first aperture, connecting said interior space and flooding chamber, means including a tubular member insertable into and withdrawable from said hollow shaft portion through said axial end opening thereof for periodically establishing an inlet passage from a lubricant feeding device through said axial end opening of said shaft and the interior of said tubular member to one of said apertures, and an outlet passage exteriorly of said tubular member from the other of said apertures through said axial end opening of said shaft, said hollow shaft portion having an internal seat, intermediate said first and second apertures, engageable by said tubular member to separate said outlet from said inlet passage; and a plug insertable into said axial end opening of said shaft, after withdrawal of said tubular member therefrom, for closing said hollow shaft portion at said axial end opening thereof.

7. The combination set forth in claim 6, in which the tubular member comprises an elongated body portion and a cylindrical coupling element permanently connected therewith and forming a radial enlargement of said body portion, and in which combination the hollow shaft portion has an axially extending inner cylindrical surface between said first and second apertures of slightly larger diameter than said coupling element to provide a loose but snug fit between said coupling element and said hollow shaft portion.

8. The combination set forth in claim 6, in which the tubular member comprises an elongated body portion and a cylindrical coupling element permanently connected therewith, and in which combination the hollow shaft portion has an axially extending inner cylindrical surface between said first and second apertures, and an inwardly projecting shoulder between said cylindrical surface and said first aperture, said cylindrical surface being of slightly larger diameter than said coupling element to provide a loose but snug fit between said coupling element and said hollow shaft portion, and said shoulder affording a stop for said tubular member to limit its axial movement into said hollow shaft portion.

9. The combination set forth in claim 6, in which the hollow shaft portion has an internal circular seat extending axially of said shaft near said end opening thereof, and a cylindrical inner surface extending axially of said shaft between said first and second apertures thereof, and in which combination the tubular member comprises an elongated body portion, a cylindrical coupling member permanently connected with said body portion and engageable with said cylindrical inner surface of said hollow shaft portion, and a non-circular collar on said body portion adapted to slidingly engage said circular seat of said hollow shaft portion to support said tubular member within said hollow shaft portion while said cylindrical coupling element is engaged with said second cylindrical inner surface of said hollow shaft portion.

10. The combination set forth in claim 6, in which said hollow shaft portion has an inwardly projecting shoulder between said first and second apertures thereof, engageable by said tubular member.

11. In a bearing, a shaft element, a housing element surrounding said shaft element in radially spaced relation thereto, a pair of axially spaced anti-friction bearings on said shaft element rotatably retaining the latter and said housing element in angularly fixed relation to each other, closure means for the space between said shaft and housing elements including a rotary seal at the axially outer side of one of said anti-friction bearings and an end closure at the axially outer side of the other of said anti-friction bearings to provide a flooding chamber for said anti-friction bearings, said flooding chamber communicating, at the axially outer side of one of said antifriction bearings, with an inlet through said shaft element for periodic connection to a lubricant feeding device, and communicating, at the axially outer side of the other of said antifriction bearings, with an outlet through said shaft element for the discharge of lubricant from said flooding chamber simultaneously with the delivery of lubricant from said feeding device into said flooding chamber, whereby delivery of lubricant from said feeding device into said flooding chamber will be effective to expel a substantial quantity of lubricant stored within said flooding chamber without forcing any lubricant through said rotary seal, and releasable closure means mounted on said shaft element for preventing passage of lubricant from said flooding chamber through said inlet and outlet during the intervals between feedings.

12. In a roller assembly a stationary shaft having an axially extending hollow portion and an axial end opening therefor, a roller having a wall surrounding said hollow shaft portion in radially spaced relation to the outer surface of said shaft, a pair of axially spaced bearings within said roller supportingly connecting said shaft and roller for relative rotation about the axis of said shaft, closure means including a rotary seal for the space between said shaft and roller at the axially outer sides, respectively, of said bearings to provide a flooding chamber for the latter within said roller, said flooding chamber communicating with the interior of said hollow shaft portion through two apertures of the latter separated from each other by an intervening space within said flooding chamber of substantial length axially of said shaft between said bearings, means including a partitioning element insertable into said hollow shaft portion through said axial end opening thereof, for periodically establishing an inlet passage from a lubricant feeding device through said axial end opening of said shaft to one of said apertures, and a separate outlet passage from the other of said apertures through said axial end opening of said shaft for the discharge of lubricant from said flooding chamber simultaneously with the delivery of lubricant from said feeding device into said flooding chamber, whereby delivery of lubricant from said feeding device will be effective to expel a substantial quantity of lubricant stored within said flooding chamber, from said intervening space thereof without forcing any lubricant through said rotary seal, and a single closure element independent of said partitioning element, for covering and uncovering the entire area of said axial end opening of said shaft.

13. A bearing assembly comprising a shaft element, an outer element having an elongated hollow portion surrounding said shaft element in radially spaced relation thereto, bearing means within said elongated hollow portion of said outer element cooperating with the latter and with said shaft element to support one of said elements for rotation with respect to the other, means for closing the space between said shaft and outer elements at opposite ends, respectively, of said hollow portion, including at least one rotary seal surrounding said shaft element, to provide a flooding chamber for said bearing means, said flooding chamber communicating, at a point in proximity to one of the closed ends thereof, with an inlet through said shaft element for periodic connection to a lubricant feeding device, and communicating, at a point in proximity to the other of the closed ends thereof, with an outlet for the discharge of lubricant from said flooding chamber simultaneously with the delivery of lubricant from said feeding device into said flooding chamber, whereby delivery of lubricant from said feeding device into said flooding chamber will be effective to expel a substantial quantity of lubricant stored within said flooding chamber without forcing any lubricant through said rotary seal, and releasable closure means for preventing passage of lubricant from said flooding chamber through said inlet and outlet during the intervals between feedings.

14. A bearing assembly comprising a shaft element, an outer element having an elongated hollow portion surrounding said shaft element in radially spaced relation thereto, bearing means within said elongated hollow portion of said outer element cooperating with the latter and with said shaft element to support one of said elements for rotation with respect to the other, means for closing the space between said shaft and outer elements at opposite ends, respectively, of said hollow portion, including at least one rotary seal surrounding said shaft element, to provide a flooding chamber for said bearing means, said flooding chamber communicating, at a point in proximity to one of the closed ends thereof, with an inlet through said shaft element for periodic connection to a lubricant feeding device, and communicating, at a point in proximity to the other of the closed ends thereof with an outlet through said shaft element for the discharge of lubricant from said flooding chamber simultaneously with the delivery of lubricant from said feeding device into said flooding chamber, whereby delivery of lubricant from said feeding device into said flooding chamber will be effective to expel a substantial quantity of lubricant stored within said flooding chamber without forcing any lubricant through said rotary seal, and releasable closure means for preventing passage of lubricant from said flooding chamber through said inlet and outlet during the intervals between feedings.

15. A bearing assembly comprising a shaft element having a longitudinal hollow portion and an axial end opening therefor, an outer element having a hollow portion surrounding said shaft element in radially spaced relation thereto, bearing means within said hollow portion of said outer element cooperating with the latter and with said shaft element to support one of said elements for rotation with respect to the other, means including a rotary sealing device surrounding said shaft element for closing the space between said shaft and outer elements at the axially outer sides, respectively, of said bearing means; said shaft element having a first aperture remote from said axial end opening thereof, connecting the hollow portion of said shaft element with said space, a second aperture intermediate said end opening and said first aperture, connecting said hollow portion of said shaft element with said space, and an internal seat intermediate said first and second apertures, engageable by a partitioning element insertable into and withdrawable from said hollow portion of said shaft element through said axial end opening thereof for periodically establishing an inlet passage from a lubricant feeding device through said axial end opening of said shaft element to one of said apertures, and a separate outlet passage from the other of said apertures through said axial end opening of said shaft element, and means for closing said axial end opening of said shaft element after withdrawal of said partitioning element therefrom to prevent loss of lubricant from said space through said hollow portion of said shaft element, during the intervals between feedings.

EMIL F. NORELIUS.